May 6, 1947.  W. P. BOOTHROYD  2,419,984
WIDE-BAND SUPERHETERODYNE RECEIVER
Filed Oct. 19, 1944
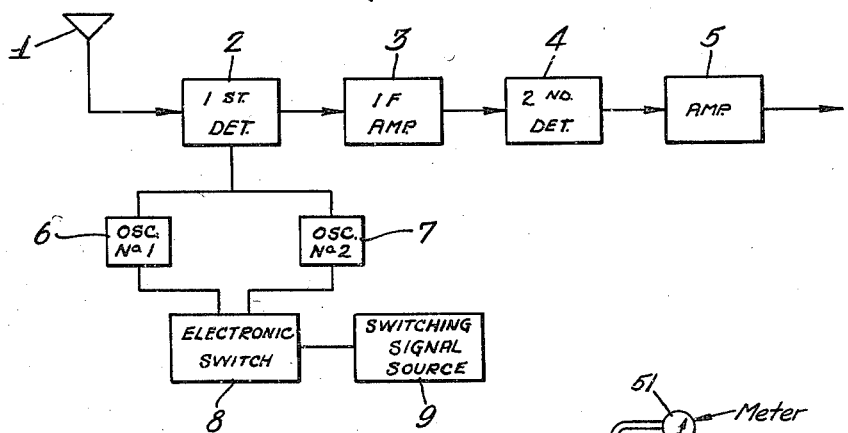
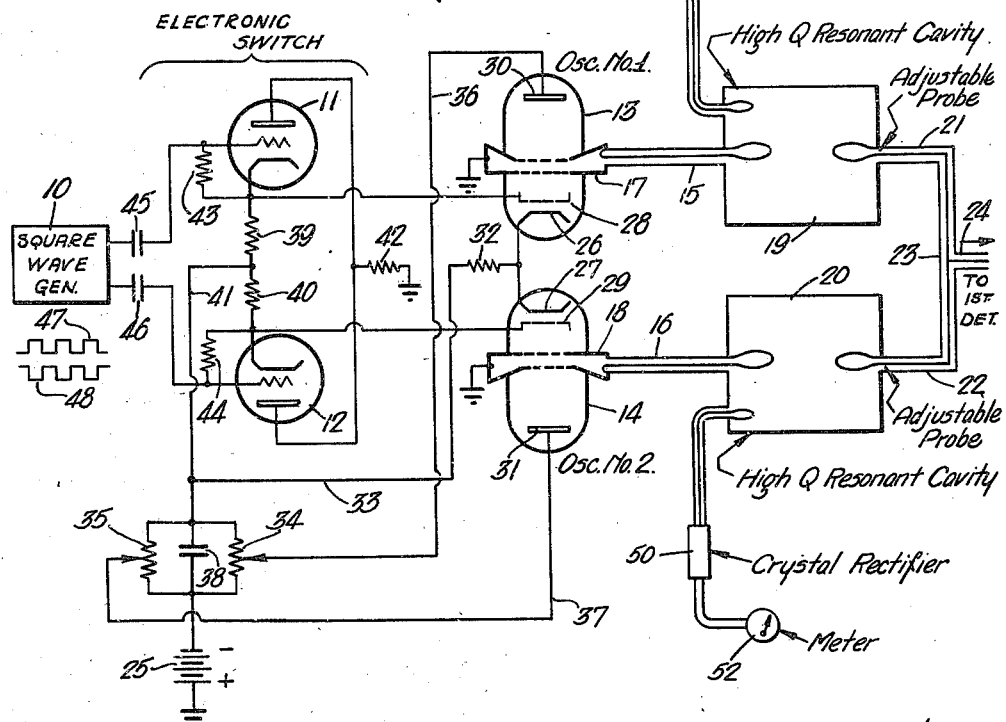
Inventor:
Wilson P. Boothroyd
by his Attorneys
Howson & Howson Patented May 6, 1947

2,419,984

UNITED STATES PATENT OFFICE 2,419,984

WIDE-BAND SUPERHETERODYNE RECEIVER

Wilson P. Boothroyd, Philadelphia, Pa., assignor, by mesne assignments, to Philco Corporation, Philadelphia, Pa., a corporation of Pennsylvania Application October 19, 1944, Serial No. 559,407

8 Claims. (Cl. 250—20)

This invention relates to improvements in wide-band superheterodyne radio receivers for use at ultra-high frequencies.

Wide-band receivers of the type with which the present invention is concerned have been found to be highly advantageous as aircraft beacon receivers, where the beacon receiver, stationed at an airport and associated with a cooperating transmitter, is required, in response to a pre-arranged code-signal—or interrogation—from an aircraft, to effect, or institute, the transmission of a respondent signal which identifies the airport in question. The aircraft may, of course, be provided with means for determining the range and azimuth of the transmitting station, i. e. of the airport.

Ordinarily these aircraft beacon systems operate in the ultra-high frequency regions, and, for various practical reasons which need not concern us here, operate—at least insofar as the airborne transmitting equipment is concerned—at carrier frequencies which may vary over substantial limits from time to time, and from aircraft to aircraft. Thus an airborne transmitter employed for beacon purposes, and having a nominal assigned carrier frequency of 1080 megacycles, may operate anywhere in the band extending from, say, 1052 to 1112 megacycles. Although the included band is 60 megacycles in width, it is important that the beacon receiver at the airport be capable of responding to the aircraft's transmission at once and without special preadjustment.

In a copending application of W. H. Newbold, Serial No. 516,479, filed December 31, 1943, there is disclosed and claimed a novel wide-band superheterodyne radio receiver which is adapted for use in an aircraft beacon system of the type above mentioned and which also has other specific uses, as set forth in the said application. A preferred embodiment of such wide-band superheterodyne radio receiver comprises a first detector or mixer stage having an input circuit responsive to a wide reception band, a narrow-band I. F. amplifier connected to the first detector, a plurality of local oscillators operable at different frequencies and coupled to the first detector or mixer, and switching means for effecting operation of said oscillators in sequence, the operating frequencies of the oscillators being so chosen in relation to the wide reception band as to produce band segments of narrow width corresponding to the pass-band of the I. F. amplifier.

In the operation of such a system at ultra-high frequencies, certain difficulties have been encountered. It was found that the power output of the local oscillators tended to vary and in some instances, a relative variation of as much as three-to-one was encountered. It was also found that the switching on and off, i. e. starting and stopping, of the local oscillators tended to produce transients in the receiver circuits, which, in the case of an aircraft beacon system, might seriously interfere with the operation of the associated transmitter. The present invention, which is the result of considerable experimental work, provides a simple solution of the problem thus presented.

The principal object of the invention, therefore, is to provide a simple and effective means for equalizing the oscillator power outputs and for preventing the production of transients in a system of the above-mentioned character.

Reference may now be had to the accompanying drawing for a full understanding of the invention.

In the drawing:

Fig. 1 is a block diagram of a superheterodyne radio receiver of the type above mentioned, with which the present invention is concerned; and Fig. 2 is a schematic diagram of a portion of the receiver embodying the present invention.

Referring to Fig. 1, the superheterodyne receiving system shown comprises an antenna 1, a wide-band first detector (frequency converter) 2, a narrow-band intermediate frequency (I. F.) amplifier 3, a second detector 4, and a suitable modulation-frequency amplifier 5. As applied to an aircraft beacon system, the receiver controls an associated transmitter with which the present invention is not concerned. The superheterodyne's local oscillator stage comprises a plurality of separate oscillators adjusted to operate at predetermined different frequencies. Two such oscillators, designated "Osc. No. 1" and "Osc. No. 2," are employed in the system of Fig. 1. These oscillators are further designated by reference characters 6 and 7, respectively. An oscillator switching device 8, preferably electronic in character, is operatively associated with the two local oscillators for the purpose of switching them alternately on and off in opposite time sequence. A switching signal source 9 may be connected to the device 6 to control the switching operation thereof.

The system, as thus far described and as illustrated in the block diagram of Fig. 1, is disclosed and claimed in the above-mentioned copending application. For the present purpose, a brief description of the operation of such system will suffice. It may be assumed, for example, that the receiver is to be used in air aircraft beacon system, as previously mentioned, and that it is desired to receive a signal in a reception band extending from, say, 1052.5 to 1112.5 megacycles, the said reception band having an over-all bandwidth of 60 megacycles. The desired signal may, of itself, occupy a band-width of only a few megacycles, but since it may occur anywhere in the 60 megacycle reception band, it is important that the receiver be capable of responding to the desired signal, whatever its carrier frequency.

As described in the above-mentioned copending application, in the case here assumed, the antenna and the input circuits to the first detector should be designed to respond to and pass the entire 60 megacycle reception band above mentioned, and the I. F. amplifier may have a relatively narrow over-all band width of 15 megacycles extending from approximately 7.5 to 22.5 mc. The local oscillators 6 and 7 may be adapted to operate at frequencies of 1075 mc. and 1090 mc., respectively. In such case, the heterodyne action of the alternately operating local oscillators will divide the 60 mc. reception band into four 15 mc. band segments. Furthermore, each band segment will be converted to an I. F. band extending from 7.5 to 22.5 mc. This is explained in detail in the above-mentioned copending application. By means of such a system, it is possible to receive signals within a wide reception band, using a narrow-band I. F. amplifier which is highly desirable.

As previously mentioned, the present invention is concerned with the utilization of such a system at ultra-high frequencies. The illustration of Fig. 2 represents an adaptation of the system for this purpose. In Fig. 2 the square wave generator 10 corresponds to the switching signal source 9 of Fig. 1. Similarly the electronic switch, comprising the tubes 11 and 12, corresponds to the electronic switch 8 of Fig. 1, while the oscillator tubes 13 and 14 correspond to the oscillators 6 and 7 of Fig. 1. The oscillators are conveniently of the Reflex Klystron type, and they are so represented in the drawing.

Signals are derived from the oscillator tubes by means of coaxial lines 15 and 16 which are inductively coupled into the cavity resonators 17 and 18 of the respective oscillators. Disregarding for the moment the devices 19 and 20, which are provided by the present invention and which will be discussed hereinafter, the signals from the oscillators are supplied via coaxial lines 21 and 22 to a coaxial T-connection 23, from whence the signals are supplied to the first detector or mixer by means of a single coaxial line 24. The first detector or mixer and other elements of the receiver may be of conventional form suitable for operation at ultra-high frequencies.

By means of the electronic switch, only one of the oscillators is operative at a given time. The electronic switch and the circuit connections between the said switch and the oscillators will now be described. Since it is desirable to operate the cavity resonators 17 and 18 at ground potential, it is conventional to connect the positive high-voltage terminal of the source 25 to ground, the cathodes 26—27 and other negative potential Klystron elements such as the grids 28—29 and repeller plates 30—31 being connected to points in the system which are at negative potentials with respect to ground. Thus, the cathodes 26—27 are connected through the common cathode resistor 32, the conductor 33, and the parallel potentiometers 34—35 to the negative terminal of the source 25. The repeller plates 30—31 are connected by way of conductors 36—37 to adjustable points on the potentiometers 34—35. Through adjustment of these devices the potentials on the repeller plates 30 and 31 may be individually fixed. A condenser 38, connected in shunt with potentiometers 34—35 may be required to prevent feed-back between the repeller plates. The control grids 28 and 29 of the Klystron oscillators are connected directly to the cathodes of triodes 11 and 12, respectively. As will be explained hereinafter, it is from the cathode load resistors 39 and 40, associated with these triodes, that control voltages are derived which effect operation of the two oscillators in alternating sequence.

The cathode load resistors 39 and 40 are connected through a common conductor 41 to the upper junction of potentiometers 34—35, and thence to the negative terminal of the source 25. The anodes of tubes 11 and 12 are connected to the grounded positive terminal of source 25 through the grounded current-limiting resistor 42. Grid leaks 43 and 44 are connected directly between the grid and cathode electrodes of tubes 11 and 12. The control grids are also coupled through condensers 45 and 46 to the source of switching signals 10 which may comprise any suitable square wave generator. This square wave generator may be of the specific form disclosed in the above-mentioned copending application. It is adapted to supply a pair of relatively reversed square wave signals as indicated at 47 and 48.

In operation, when the grid of tube 11 is driven in the positive direction, plate current is caused to flow, and the upper end of cathode load resistor 39 assumes a positive potential with respect to the lower end thereof. Since this resistor is in the grid-cathode circuit of oscillator 13, a positive voltage is applied to the grid of the said oscillator, permitting the previously blocked plate current to flow, and thereby enabling oscillation to commence. Simultaneously, the grid of tube 12 is driven in the negative direction, cutting off the plate current in this tube and reducing the voltage across the cathode load resistor 40 substantially to zero. The only voltage in the grid-cathode circuit of oscillator 14 is, under these conditions, the bias across the common cathode resistor 32 produced by the flow of space current in oscillator 13. This bias is preferably of a magnitude such as to bias oscillator 14 to, or below, space current cut-off, thus effectively preventing oscillation of the latter oscillator. During the following half cycle, the action is reversed, oscillator 14 being operative, and oscillator 13 being inoperative. Thus, the electronic switch, including tubes 11 and 12, effects operation of the two oscillators in alternating sequence.

As thus far described, and disregarding the elements 19 and 20 hereinbefore mentioned, the arrangement of Fig. 2 corresponds to that disclosed in the above-mentioned application. As previously mentioned, such an ultra-high frequency system presented certain difficulties, due to relative variation of the power outputs of the local oscillators and the production of a transient pulse in the receiver output during switching of the oscillators. This transient pulse was found to be due to the fact that the envelope of each local oscillator signal contained objectionable frequency components at its leading and trailing edges, which components were within or adjacent the pass-band of the I. F. amplifier and formed the objectionable transient pulse in the receiver output.

In accordance with the present invention, these difficulties are overcome by interposing in each of the coaxial lines connected to the oscillator cavities a high Q resonant cavity employing reasonably large input and output coupling loops, as represented in simple form at 19 and 20. Each of these resonant cavities is adjusted to be resonant at the operating frequency of the associated local oscillator. Since the "equivalent" time constant of each cavity is longer than that of the associated oscillator cavity, a less rapid rise and fall of the oscillator signal's envelope is effected, thus reducing or removing the above-mentioned frequency components which caused the transient pulse during switching. Each high Q cavity also increases the frequency stability of the associated oscillator tube. Moreover, transmission loss through the cavity is low due to the reasonably large coupling employed.

Further still, by making the output probe of each resonant cavity adjustable, as indicated, the oscillator outputs may be relatively controlled without appreciably changing the resonant frequency of the cavity. In this manner, the objectionable relative variation of the oscillator outputs may be overcome.

It may be stated generally that the degree of the above-mentioned effects of the resonant cavities 19 and 20 depends on the relative Q values and the relative couplings. In any case, these perameters may be determined according to the degree to which the undesired conditions are present.

In addition to serving the purposes above mentioned, the resonant cavities 19 and 20, being tuned to the oscillator frequencies, may be utilized as wavemeters simply by employing a crystal detector in connection with each cavity. As illustrated, crystal rectifiers 49 and 50 may be inductively coupled to the respective cavities, and D. C. meters 51 and 52 may be connected to said rectifiers. Thus, the cavities may serve a dual purpose, and since oscillator wavemeters are desirable in such a system, the invention may be utilized without employing any additional parts.

By way of example, the circuit elements of the system illustrated may be as follows. The oscillators 13 and 14 may be Reflex Klystrons each drawing 15 to 20 ma. during oscillation. A double triode tube of the type designated 6SN7GT may be employed in the electronic switch circuit. The resistors and condensers may have the following values.

| | | |
|---|---|---|
| Resistor 32 | ohms | 1,000 |
| Resistor 42 | do | 50,000 |
| Resistors 39 and 40 | do | 6,800 |
| Resistors 43 and 44 | megohms | 1 |
| Resistors 34 and 35 | ohms | 10,000 |
| Condenser 38 | microfarads | 0.25 |

Source 25 may provide a potential of 700 volts. Each of the resonant cavities may have a Q value of 1500.

It will be seen that the invention provides a simple and effective means for overcoming the above mentioned objections in a system of the character here involved. It will be understood, of course, that the invention is not limited to the specific details of construction, and that various modifications thereof may be made within the scope of the appended claims.

I claim:

1. In a superheterodyne radio receiver for operation at ultra-high frequencies, a first detector having an input circuit responsive to a relatively wide reception band, an intermediate frequency amplifier having a relatively narrow pass-band connected to the output of said first detector, a plurality of local oscillators operable at different frequencies, means coupling each of said oscillators to said first detector, switching means for effecting operation of said oscillators in sequence, thereby to convert the said wide reception band into a plurality of relatively narrow intermediate frequency band-segments of substantially like band limits, and a plurality of resonant cavities interposed in the respective coupling means for said oscillators, said cavities being resonant respectively at the operating frequencies of said oscillators.

2. In a superheterodyne radio receiver for operation at ultra-high frequencies, a first detector having an input circuit responsive to a relatively wide reception band, an intermediate frequency amplifier having a relatively narrow pass-band connected to the output of said first detector, a plurality of local oscillators operable at different frequencies, means coupling each of said oscillators to said first detector, switching means for effecting operation of said oscillators in sequence, thereby to convert the said wide reception band into a plurality of relatively narrow intermediate frequency band-segments of substantially like band limits, and a plurality of high Q resonant cavities interposed in the respective coupling means for said oscillators, said cavities being resonant respectively at the operating frequencies of said oscillators.

3. In a superheterodyne radio receiver for operation at ultra-high frequencies, a first detector having an input circuit responsive to a relatively wide reception band, an intermediate frequency amplifier having a relatively narrow pass-band connected to the output of said first detector, a plurality of local oscillators operable at different frequencies, means coupling each of said oscillators to said first detector, switching means for effecting operation of said oscillators in sequence, thereby to convert the said wide reception band into a plurality of relatively narrow intermediate frequency band-segments of substantially like band limits, and a plurality of resonant cavities interposed in the respective coupling means for said oscillators, said cavities being resonant respectively at the operating frequencies of said oscillators, each of said cavities having relatively large input and output coupling loops.

4. In a superheterodyne radio receiver for operation at ultra-high frequencies, a first detector having an input circuit responsive to a relatively wide reception band, an intermediate frequency amplifier having a relatively narrow pass-band connected to the output of said first detector, a plurality of local oscillators operable at different frequencies, coaxial line connections to the outputs of said oscillators, a coaxial line T-connection for supplying the output oscillations from said oscillators to said first detector, switching means for effecting operation of said oscillators in sequence, thereby to convert the said wide reception band into a plurality of relatively narrow intermediate frequency band-segments of substantially like band limits, and a plurality of resonant cavities interposed in the respective coaxial line connections to the outputs of said oscillators, said cavities being resonant respectively at the operating frequencies of said oscillators.

5. In a superheterodyne radio receiver for operation at ultra-high frequencies, a first detector having an input circuit responsive to a relatively wide reception band, an intermediate frequency amplifier having a relatively narrow pass-band connected to the output of said first detector, a plurality of local oscillators operable at different frequencies, means coupling each of said oscillators to said first detector, switching means for effecting operation of said oscillators in sequence, thereby to convert the said wide reception band into a plurality of relatively narrow intermediate frequency band-segments of substantially like band limits, a plurality of resonant cavities interposed in the respective coupling means for said oscillators, said cavities being resonant respectively at the operating frequencies of said oscillators, and adjustable coupling means for each cavity whereby the relative power outputs of said oscillators may be adjusted.

6. In a superheterodyne radio receiver for operation at ultra-high frequencies, a first detector having an input circuit responsive to a relatively wide reception band, an intermediate frequency amplifier having a relatively narrow pass-band connected to the output of said first detector, a plurality of local oscillators operable at different frequencies, means coupling each of said oscillators to said first detector, switching means for effecting operation of said oscillators in sequence, thereby to convert the said wide reception band into a plurality of relatively narrow intermediate frequency band-segments of substantially like band limits, a plurality of high Q resonant cavities interposed in the respective coupling means for said oscillators, said cavities being resonant respectively at the operating frequencies of said oscillators, and adjustable coupling means for each cavity whereby the relative power outputs of said oscillators may be adjusted.

7. In a superheterodyne radio receiver for operation at ultra-high frequencies, a first detector having an input circuit responsive to a relatively wide reception band, an intermediate frequency amplifier having a relatively narrow pass-band connected to the output of said first detector, a plurality of local oscillators operable at different frequencies, means coupling each of said oscillators to said first detector, switching means for effecting operation of said oscillators in sequence, thereby to convert the said wide reception band into a plurality of relatively narrow intermediate frequency band-segments of substantially like band limits, and a plurality of resonant cavities interposed in the respective coupling means for said oscillators, said cavities being resonant respectively at the operating frequencies of said oscillators, each of said cavities having relatively large input and output coupling loops, the output coupling loops being adjustable to compensate for relative variation of the power outputs of said oscillators.

8. In a superheterodyne radio receiver for operation at ultra-high frequencies, a first detector having an input circuit responsive to a relatively wide reception band, an intermediate frequency amplifier having a relatively narrow pass-band connected to the output of said first detector, a plurality of local oscillators operable at different frequencies, means coupling each of said oscillators to said first detector, switching means for effecting operation of said oscillators in sequence, thereby to convert the said wide reception band into a plurality of relatively narrow intermediate frequency band-segments of substantially like band limits, a plurality of resonant cavities interposed in the respective coupling means for said oscillators, said cavities being resonant respectively at the operating frequencies of said oscillators, and a crystal rectifier and a D. C. meter coupled to each of said resonant cavities whereby the latter serve as wave meters.

WILSON P. BOOTHROYD.

REFERENCES CITED

The following references are of record in the file of this patent:

UNITED STATES PATENTS

| Number | Name | Date |
|---|---|---|
| 2,273,914 | Wallace | Feb. 24, 1942 |
| 2,312,203 | Wallace | Feb. 23, 1943 |
| 2,287,925 | White | June 30, 1942 |